(12) United States Patent
Tomomatsu et al.

(10) Patent No.: US 6,686,406 B2
(45) Date of Patent: Feb. 3, 2004

(54) DIELECTRIC CERAMIC, RESIN-CERAMIC COMPOSITE MATERIAL, ELECTRICAL PART AND ANTENNA, AND MANUFACTURING METHOD THEREOF

(75) Inventors: Isao Tomomatsu, Tokyo (JP); Masayuki Ishiwa, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/014,086

(22) Filed: Dec. 10, 2001

(65) Prior Publication Data

US 2002/0098970 A1 Jul. 25, 2002

Related U.S. Application Data

(63) Continuation of application No. PCT/JP01/03634, filed on Apr. 26, 2001.

(30) Foreign Application Priority Data

Apr. 26, 2000 (JP) ........................................ 2000-126638
May 18, 2000 (JP) ........................................ 2001-147024

(51) Int. Cl.⁷ ........................ C08K 3/22; C04B 35/468; H01Q 1/00
(52) U.S. Cl. ........................ 524/403; 501/138; 501/139; 343/785; 343/907
(58) Field of Search ................................. 501/138, 139; 524/403; 343/785, 907

(56) References Cited

U.S. PATENT DOCUMENTS 5,962,122 A * 10/1999 Walpita et al. .............. 428/325

FOREIGN PATENT DOCUMENTS

| JP | 56-25453 | 12/1981 |
| JP | 61-183473 | 8/1986 |
| JP | 06-223625 | 8/1994 |
| JP | 8 69712 | 3/1996 |
| JP | 09-036650 | 2/1997 |
| JP | 11-060274 | 3/1999 |
| WO | 97/20332 A1 | 6/1997 |

* cited by examiner

*Primary Examiner*—David Brunsman
(74) *Attorney, Agent, or Firm*—Knobbe Martens Olson & Bear LLP

(57) ABSTRACT

A dielectric ceramic containing Bi, Zn, and Sr as constituent elements. A resin-ceramic composite material containing a mixture of the dielectric ceramic powder and an organic polymer resin. An antenna and an electrical part using the composite material, and a manufacturing method thereof.

16 Claims, 5 Drawing Sheets

Mp vs Δtanδ

Mp vs Δε

Mw vs $\Delta \tan \delta$

Mw vs $\Delta \varepsilon$

Mp vs $\Delta \tan \delta$

Mp vs $\Delta \varepsilon$

US 6,686,406 B2

DIELECTRIC CERAMIC, RESIN-CERAMIC COMPOSITE MATERIAL, ELECTRICAL PART AND ANTENNA, AND MANUFACTURING METHOD THEREOF

This is a continuation of PCT Application PCT/JP01/03634, filed Apr. 26, 2001. The prior PCT application has not yet published under PCT Article 21(2).

TECHNICAL FIELD

The present invention relates to electrical parts, for example, they are dielectric antenna, such as a microwave antenna used for mobile communications and walkie-talkies; condensers, filters, and printed circuit substrate for the high-frequency range of microwaves or higher frequency. In addition, the present invention relates to a manufacturing method for the above mentioned electrical parts, such as an antenna.

Further, the present invention relates to a dielectric ceramic suitable for dielectrics of such electrical parts, and resin-ceramic composite material.

BACKGROUND ART

As a conventional material for a microwave antenna, a condenser, a filter, and a printed circuit substrate for high-frequency use, ceramics made by baking are mainly used. The baked ceramics have an advantage that they can attain a high dielectric constant ($\in$) and a low dielectric dissipation factor (tan $\delta$), compatibly. However, the conventional material is never free from an antinomic relation that a composition whose change in dielectric constant owing to change of temperature (i.e. temperature dependence) is small, causes a low dielectric constant. Further, the baked ceramic material has defects that they require a baking step to be conducted at a temperature above 1,000° C., they have difficulty in post-processing, because of hardness and brittleness, and they have difficulty in post-forming a metal pattern (the pattern is formed by means of converting a paste of a metal, such as silver, drawn in a pattern beforehand, into a metal itself, at the baking step).

On the other hand, a composite material, comprising a resin blended with a ceramic powder, has been developed (for example, JP-A-8-69712 ("JP-A" means unexamined published Japanese patent application)). The composite material obtained in this way has an advantage of being readily processable (i.e. a general method for molding resins can be employed). However, the dielectric constant generally decreases when a ceramic is powderized. As such, the conventional composite material blended with a ceramic powder has a disadvantage of a low dielectric constant.

Further, there is a problem in the composite material that, when a conventional ceramic with a high dielectric constant is employed, to raise the dielectric constant of a composite material, the temperature dependency of dielectric constant of the composite material increases, as in the case of the said baked ceramic. On the other hand, when a ceramic with a large particle size, or a fiber-shaped ceramic, is used for the purpose of maintaining a dielectric constant as high as possible, the composite material becomes inferior in formability and difficulty of forming a minute metal pattern when used for a printed circuit substrate.

Additionally, a resin-ceramic composite material, using polyphenylene sulfide (PPS) as a resin, is described in JP-A-9-36650. The PPS is highly evaluated for its low tan $\delta$. However, an investigation by the present inventors revealed that there was still room to reduce changes of characteristics by moisture absorption. Namely, it was found that reduction of the changes of tan $\delta$ and $\in$ by moisture absorption was desirable. However, these points were not studied in the above-mentioned JP-A-9-36650.

In addition, as PPS was a resin hard to plate thereon, because it had high chemical resistance and therefore it exhibited low adhesion strength to adhesives. As such, the use of a resin-ceramic composite material using PPS for electrical parts, such as a dielectric antenna, has been very limited.

To solve this kind of problem, a method of using a ceramic powder with a limited particle size, ranging from 1 to 10 μm, and plating the obtained PPS resin composition, after a surface treatment, by wet etching with solvent or solution, is disclosed in JP-A-61-183473. However, a wet etching has a disadvantage in cleaning, after the treatment was performed. In addition, a solvent that can etch PPS is extremely limited to specific ones, and such special solvents are not good for workers, because of harmful effects on the human body and a foul odor. In JP-B-56-25453 ("JP-B" means examined published Japanese patent application), a method, in which plating is carried out after physical etching and a modification of PPS surface by a treatment with an oxidizing solution, is also disclosed. However, there is the same problem as above because the oxidizing solution is also extremely limited to such specific solutions.

The above-mentioned and other and further features, and advantages of the invention will appear more fully from the following description, taken in connection with the accompanying drawings.

BRIEF DESCRIPTION OF THE DRAWINGS

FIG. 9(A) is a front view and FIG. 9(B) is a plane view.

DISCLOSURE OF THE INVENTION

Figure 1:
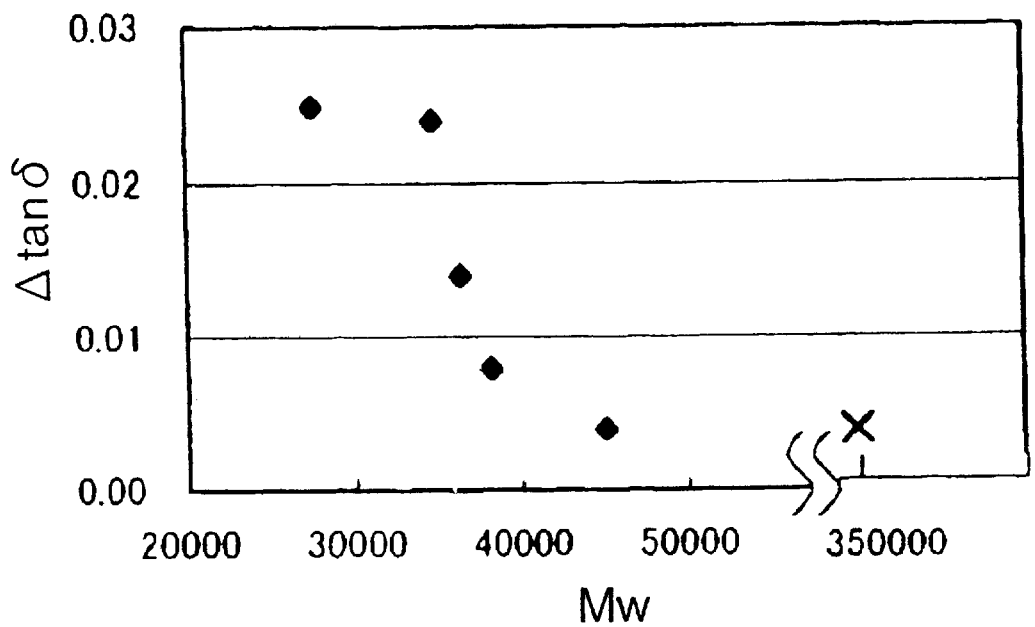
FIG. 1 is a graph showing the relationship between a change of dielectric dissipation factor ($\Delta$ tan $\delta$) and mass average molecular weight (Mw) of PPS in PPS-ceramic composite material that was left under a humid condition of 85° C. and 85% RH for 1,000 hours.

According to the present invention, the following means are provided.

(1) A dielectric ceramic comprising Bi, Zn, and Sr as constituent elements.
(2) The dielectric ceramic of item (1) comprising Ba, Nd, Ti, Bi, Zn, and Sr as constituent elements.
(3) The dielectric ceramic of item (1) comprising Ba, Nd, Ti, Bi, Zn, Sr, Nb, and rare earth elements (provided that Nd is excluded) as constituent elements.
(4) The dielectric ceramic of item (1) comprising Ba, Nd, Ti, Bi, Zn, Sr, Nb, La, Ce, and Pr as constituent elements.
(5) A dielectric ceramic, in which, to a main composition expressed by $xBaO \cdot yNd_2O_3 \cdot zTiO_2 \cdot wBi_2O_3$, wherein
  $0.13 \leq x \leq 0.20$;
  $0.28 \leq y \leq 0.35$;
  $0.33 \leq z \leq 0.45$;
  $0.09 \leq w \leq 0.15$; and
  $x+y+z+w=1$,
La, Ce, Pr, Nb, Zn, Sr as constituent elements are included with amounts ranging 2 to 5 mass % for La, 1 to 2 mass % for Ce, and 0.03 to 1 mass % for each of Pr, Nb, Zn and Sr (all ceramics as a whole, including the above main composition, make up 100 mass %).
(6) A resin-ceramic composite material comprising a mixture of a powder of the dielectric ceramic according to any one of items (1) to (5) and an organic polymer resin.
(7) The resin-ceramic composite material of item (6), wherein the organic polymer resin is polyphenylene sulfide (PPS).
(8) The resin-ceramic composite material of item (7), wherein the mass average molecular weight (Mw) of the PPS is 35,000 or more.
(9) The resin-ceramic composite material of item (7) or (8), wherein the molecular weight at a maximum frequency in molecular weight distribution (peak molecular weight (Mp)) of the PPS is 31,000 or more.
(10) A resin-ceramic composite material comprising a mixture of dielectric ceramic powder and polyphenylene sulfide (PPS).
(11) The resin-ceramic composite material of item (10), wherein the weight average molecular weight (Mw) of the PPS is 35,000 or more.
(12) The resin-ceramic composite material of item (10) or (11), wherein the molecular weight at a maximum frequency in molecular weight distribution (peak molecular weight (Mp)) of the PPS is 31,000 or more.
(13) The resin-ceramic composite material of any one of items (6) to (12), wherein the mean particle diameter of the ceramic powder used for said resin-ceramic composite material is 6 $\mu$m or less.
(14) The resin-ceramic composite material of any one of items (6) to (13), wherein an inorganic filler with a dielectric dissipation factor of 0.001 or less, a dielectric constant of 6 or less, and a temperature dependency of dielectric constant of $\pm 100$ ppm/° C. or less, is added to said resin-ceramic composite material as a third constituent.
(15) The resin-ceramic composite material of any one of items (6) to (14), wherein a lubricity auxiliary is added to said resin-ceramic composite material.
(16) An electrical part prepared by using the resin-ceramic composite material of any one of items (6) to (15).
(17) The electrical part of item (16), wherein the surface of the resin-ceramic composite material is plated.
(18) An antenna, in which a dielectric is formed using the resin-ceramic composite material of any one of items (6) to (15).
(19) The antenna of item (18), wherein the surface of the resin-ceramic composite material is plated.
(20) A method for producing an electrical part with a resin-ceramic composite material, comprising steps of: molding a resin-ceramic composite material comprising a mixture of dielectric ceramic powder with a mean particle diameter of 6 $\mu$m or less, and polyphenylene sulfide (PPS), by an injection-molding; removing a surface skin layer consisting of only PPS, formed on the surface of the molded part; and plating thereon.
(21) A method for producing an antenna with a resin-ceramic composite material, comprising steps of: molding a resin-ceramic composite material comprising a mixture of dielectric ceramic powder with a mean particle diameter of 6 $\mu$m or less, and polyphenylene sulfide (PPS) by an injection-molding; removing a surface skin layer consisting of only PPS, formed on the surface of the molded part; and plating thereon.

In this connection, as a method to measure the weight average molecular weight of PPS, use was made of a method in which measurement is carried out by GPC (gel permeation chromatography; column temperature, 210° C.), after solving PPS in $\alpha$-chloronaphthalene at a temperature of 250° C. Further, the meanings of Mw and Mp are as follows.

Mw=$\Sigma${(occupying ratio of a component having a molecular weight to the whole)$\times$(molecular weight of the component)}

Mp; molecular weight at a maximum frequency of molecular weight distribution data.

A mean particle diameter of dielectric ceramic powder was measured with a micro-track method (measuring particle size by laser diffraction).

A mean particle diameter of dielectric ceramic powder of 1 $\mu$m or more is preferable in light with handling.

BEST MODE FOR CARRYING OUT THE INVENTION

The present invention is described in detail in the following.

(On the Dielectric Ceramics)

The present inventors have found as a result of various investigations that a powder of ceramic of the present invention gives a higher dielectric constant than its sintered material, and that a resin-ceramic composite material with a high dielectric constant can be obtained with the ceramic powder, and reached the present invention on these findings.

A dielectric constant of a ceramic powder in a resin-ceramic composite material is generally shown by an effective dielectric constant calculated by the following formula (1), which is known as an approximation formula for a dielectric constant of a mixture.

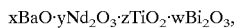   formula (1)

(Vp, Volume fraction occupied by organic polymer; Vf, Volume fraction occupied by ceramic powder; ∈p, Dielectric constant of organic polymer; ∈f, Dielectric constant of ceramic powder).

Herein, Vp and ep are known from physical property values of the organic polymer. ∈ can be obtained by dielectric constant measurement of the composite material. Vf can be calculated from a specific gravity of the composite material, a mixing mass ratio of the ceramic powder and resin, and a specific gravity of the resin. Thus, ∈f (an effective dielectric constant of the ceramic powder) can be obtained from the formula (1).

The dielectric ceramic of the present invention is described in the aforementioned items (1) to (5). As a preferable specific example, $BaO\text{—}Nd_2O_3\text{—}TiO_2\text{—}Bi_2O_3\text{—}La\text{—}Ce\text{—}Pr\text{—}Nb\text{—}Zn\text{—}Sr$—series ceramic can be nominated.

As a more preferable specific example, a ceramic whose main composition is expressed by the compositional formula of $$xBaO \cdot yNd_2O_3 \cdot zTiO_2 \cdot wBi_2O_3,$$

can be mentioned. In the formula, x, y, z and w are preferably in the following ranges:

0.13≦x≦0.20;
0.28≦y≦0.35;
0.33≦z≦0.45;
0.09≦w≦0.15; and
x+y+z+w=1.

Preferable blending amount of other elements to the main composition are respectively, 2 to 5 mass % for La, 1 to 2 mass % for Ce, and 0.03 to 1 mass % for each of Pr, Nb, Zn, and Sr (herein ceramic powder as a whole make up 100 mass %). Besides, Na, Mg, Al, Si, P, S, K, Ni, and Ca may be included in the range of 0.5 mass % or less, respectively.

The above mentioned constituent elements exist as constituent elements (elements with certain valencies) of oxides or other chemical compounds in the ceramic. Therefore, each of the elements is not limited to exist with a single valency, and the present invention includes a case where several forms of an element different in their valencies coexist. In addition, blending amounts of La, Ce, Pr, Nb, Zn, and Sr are not those of chemical compounds thereof, but values that are converted based on elements having such valencies. The present invention includes a case where all constituent elements exist as oxides in the ceramic.

The ceramic powder used in the present invention can be prepared with a general preparation method of ceramic powders. For example, oxides or carbonates of each elements are weighed in mole ratio corresponding to the chemical composition, subjected to wet grinding with a ball mill, dried in air, and baked at 900 to 1250° C. The baked material is then subjected to wet grinding with $ZrO_2$ balls and dried to obtain the objected powder.

The ceramic powder can be also prepared with a synthetic method from vapor phase or liquid phase.

The above mentioned dielectric ceramic has a characteristic of having a high dielectric constant (written as ∈ in the remainder) even after being powderized. In addition, it has advantages of having a little change of ∈ by temperature fluctuation, and a low dielectric dissipation factor (written as tan δ in the remainder).

Therefore, the above mentioned dielectric ceramic is suitably used as a composite material, prepared by powderizing the ceramic and blending with an organic polymer resin. The composite material employed the powder of this dielectric ceramic is high in δ, is small in change of ∈ owing to fluctuation of temperature (small in temperature dependence), and is small in tan δ, compared to a composite material employed other dielectric ceramic.

In this case, there is no special restriction in a particle diameter of a ceramic powder, but one having a mean particle diameter in the range of 1 to 6 μm is preferable by the reason described later.

(On the Organic Polymer Resin)

Further, as an organic polymer resin used for the resin-ceramic composite material of the present invention, either thermosetting resin or thermoplastic resin is available.

For a use in a relatively narrow range of operating temperature, a general purposed resin, such as polyethylene and polypropylene, can be used, because a volume change of a resin owing to temperature fluctuation does not give a big influence on characteristics of a resin-ceramic composite material.

In order to effectively utilize advantages of the dielectric ceramic powder, i.e. being small in change of ∈ by temperature fluctuation and low in dielectric dissipation factor, use of a resin that is low in dielectric dissipation factor and small in change of ∈ by temperature fluctuation, is preferable. Furthermore, for a use in wide range of an operating temperature, a resin with a little expansion coefficient is preferable, because a change of ∈ in the composite material by temperature fluctuation becomes less when a volume change of the resin by heating is small. As examples for such a resin, there are a liquid crystal polymer, polyetherimide (PEI), syndiotactic poly-styrene (SPS), alicycle type polyolefin, and a cyanate resin. However, polyphenylene sulfide (PPS) is the most suitable resin.

A change of ∈ by temperature fluctuation of the above composite material, comprising the powder of the dielectric ceramic and PPS, can be made remarkably small in comparison with a composite material using other resin. As a result, the above composite material comprising a powder of the dielectric ceramic and PPS gives a high ∈, a little change of ∈ by temperature fluctuation, and a very little tan δ, in comparison with other composite materials.

Said cyanate resin is a general term for compounds, which are thermosetting and have a cyanate group of 2 or more and usually 5 or more in the molecule. For instance, it is expressed by a formula $R\text{—}(O\text{—}C\equiv N)_n$, (in the formula, R is an organic group of aromatic, n is an integer of 2 to 5). A cyanate resin is also known as a cyanic acid ester resin, or a triazine resin. There is a "BT resin" (trade name, made by Mitsubishi Gas Chemical Co., Ltd.) as an specific example of a commercial cyanate resin.

In the resin-ceramic composite material of the present invention, preferable blending quantity of dielectric ceramic powder is 20 to 90 weight %, and that of organic polymer is 10 to 80 weight %; more preferable blending quantity of dielectric ceramic powder is 50 to 85 weight %, and that of organic polymer is 15 to 50 weight %.

Volume fraction of PPS in the resin-ceramic composite material is preferably 30 to 95 volume % and more preferably 45 to 70 volume % (the composite material as a whole makes up 100 volume %).

(On the Polyphenylene Sulfide (PPS))

The PPS preferably used for the resin-ceramic composite material of the present invention will be described in the following.

Figure 3:
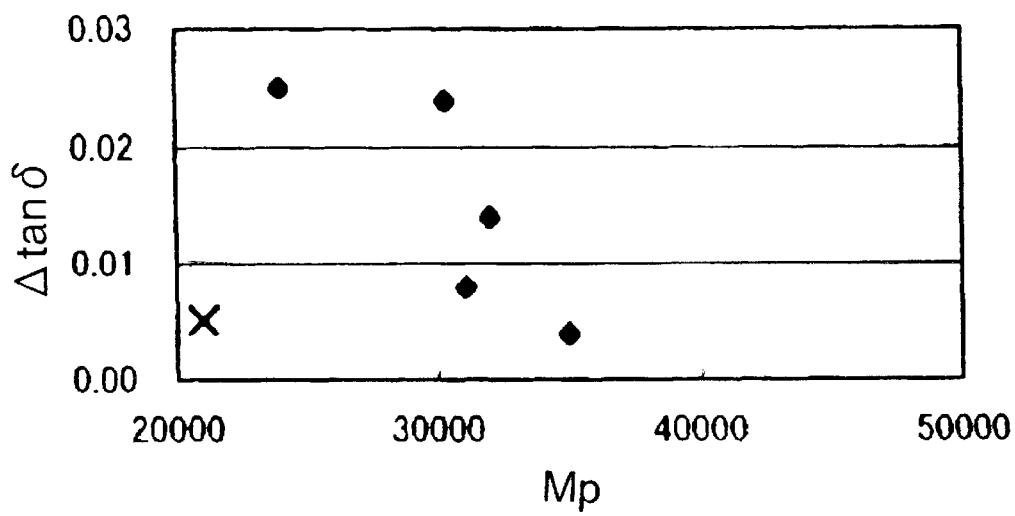
FIG. 3 is a graph showing the relationship between a change of dielectric dissipation factor ($\Delta$ tan $\delta$) and molecular weight of a maximum frequency in molecular weight distribution (Mp) of PPS in PPS-ceramic composite material that was left under a humid condition of 85° C. and 85% RH for 1,000 hours.
Figure 4:
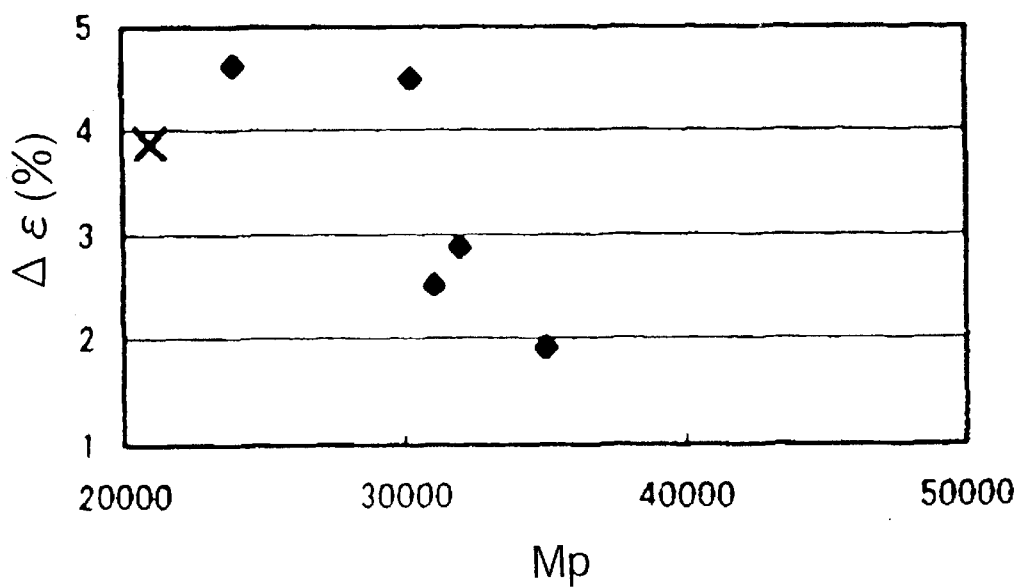
FIG. 4 is a graph showing the relationship between a change of dielectric constant ($\Delta\in$) and molecular weight of a maximum frequency in molecular weight distribution (Mp) of PPS in PPS-ceramic composite material that was left under a humid condition of 85° C. and 85% RH for 1,000 hours.
Figure 5:
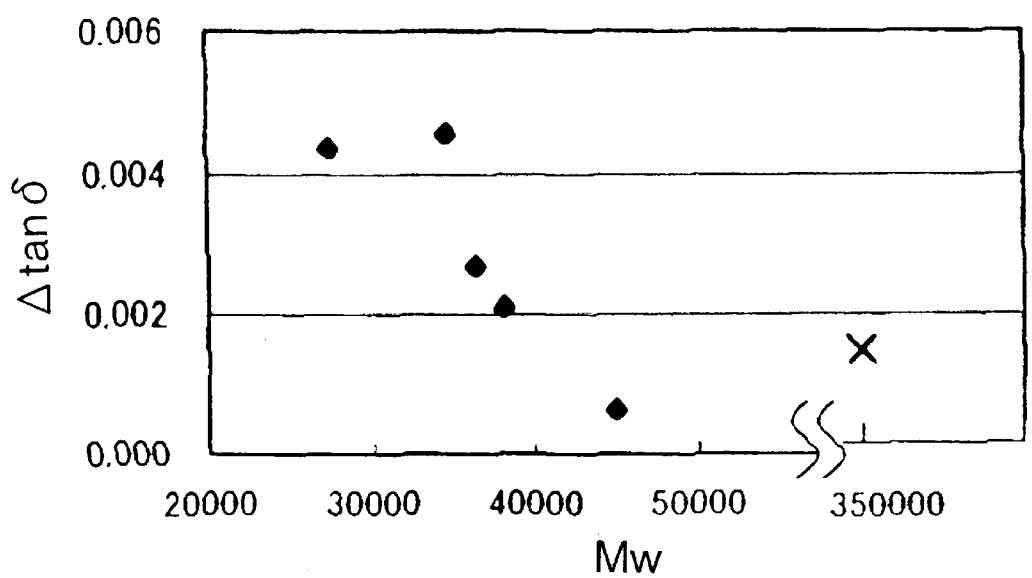
FIG. 5 is a graph showing the relationship between a change of dielectric dissipation factor ($\Delta$ tan $\delta$) and mass average molecular weight (Mw) of PPS in PPS-ceramic composite material that was left under a humid condition of 85° C. and 85% RH for 1,000 hours.

FIGS. 1 to 8 are graphs showing changes of $\in$ and tan δ of a PPS-ceramic composite material (composition), which was left under a humid condition of 85° C. and 85% RH for 1,000 hours, by plotting against mass average molecular weight (Mw) or molecular weight at a maximum frequency in molecular weight distribution (peak molecular weight (Mp)) of the PPS. The absolute values of differences between values of $\in$ and tan δ before and after moisture absorption are respectively shown with $\Delta\in$ and $\Delta$ tan δ. As is shown in FIGS. 1 and 5, a change of tan δ after moisture absorption decreases as Mw increases. The values are remarkably different on a border at Mw of 35,000, in particular.

Therefore, mixing PPS having weight average molecular weight (Mw) of 35,000 or more, and dielectric ceramic powder, is preferable for the resin-ceramic composite material. In the above, PPS with Mw of 35,000 or more and 400,000 or less is more preferable, and PPS with Mw of 36,000 to 46,000 is most preferable. Too small Mw may cause a large change of tan δ owing to moisture absorption.

PPS with Mw of 35,000 or more results in a PPS-ceramic composite material of a little change of tan δ owing to moisture absorption.

Figure 2:
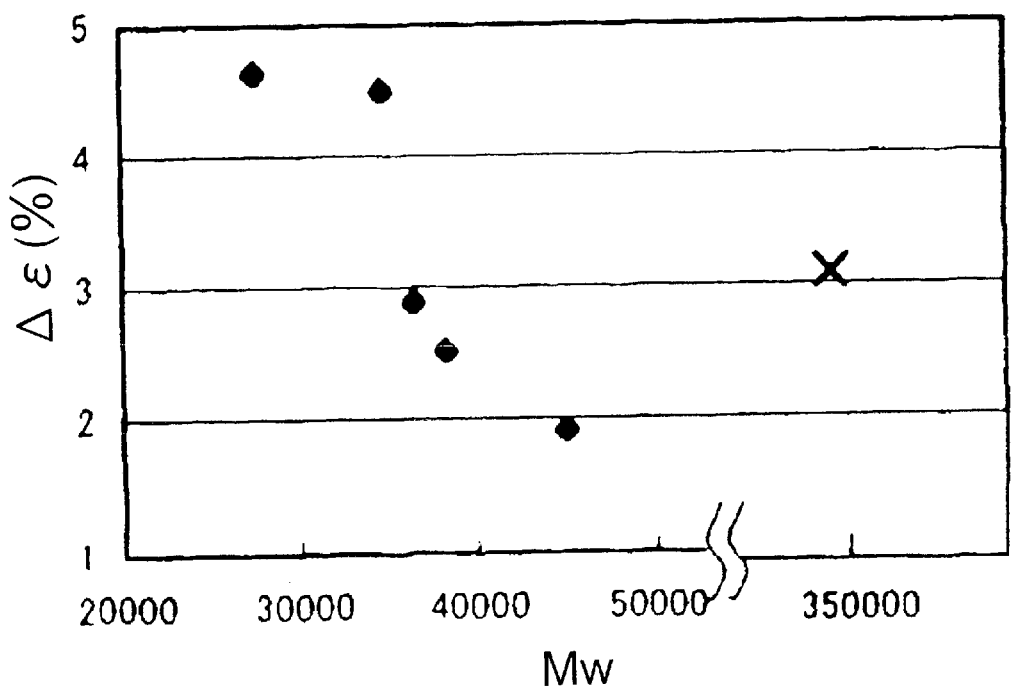
FIG. 2 is a graph showing the relationship between a change of dielectric constant ($\Delta\in$) and mass average molecular weight (Mw) of PPS in PPS-ceramic composite material that was left under a humid condition of 85° C. and 85% RH for 1,000 hours.
Figure 6:
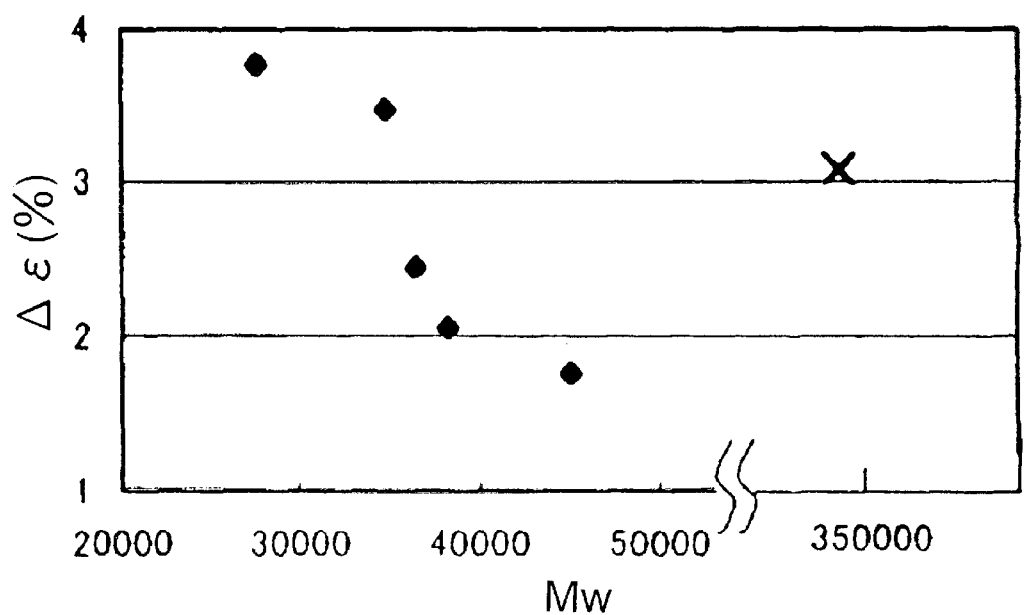
FIG. 6 is a graph showing the relationship between a change of dielectric constant ($\Delta\in$) and mass average molecular weight (Mw) of PPS in PPS-ceramic composite material that was left under a humid condition of 85° C. and 85% RH for 1,000 hours.

However, as shown in FIGS. 2 and 6, a particular tendency is not seen on the change of $\in$. This is because the $\in$ change rate of high polymer PPS having Mw of 344,000 (the value shown with "x" in the figure) is high.

Weight average molecular weight (Mw) is generally used to describe molecular weight, and GPC is commonly used for its measurement. In this method, the occupying ratio of a component having a certain molecular weight to the whole is calculated, by separating the resin that is turned into a solution, based on molecular weights with a gel column. Therefore, Mw may become a significantly large value, even when slightest amount of a component having super high molecular weight is included. This is because the Mw is calculated by a formula Mw=Σ{(occupying ratio of a component having a molecular weight to the whole)×(the molecular weight value of the component)}. In case of a general resin, a large difference is not seen between a molecular weight at a maximum frequency in molecular weight distribution (peak molecular weight (Mp)) and Mw. However, in case of PPS, the above difference can become extremely large. For example, Mp is only 21,000 against 344,000 of Mw in the case of a crosslinking type polymer (trade name, PPS, K-4 made by TOHPREN Co., Ltd.). Namely, in this example, Mw is calculated too large because of existence of a slight amount of a component having a super high molecular weight, though molecular weights of the major components are small.

We have found that the resin-ceramic composite material with a little change of $\in$ by moisture absorption can be made by using PPS having Mp of 31,000 or more.

Figure 7:
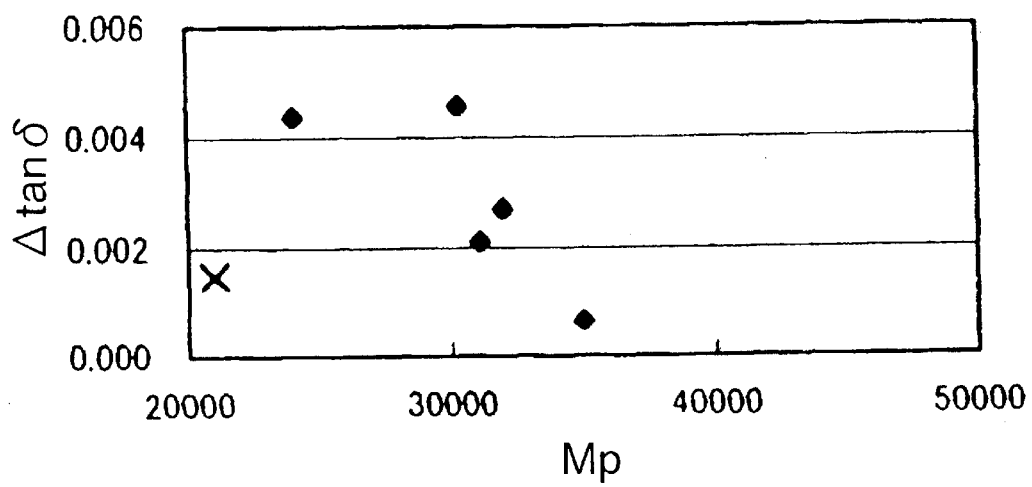
FIG. 7 is a graph showing the relationship between a change of dielectric dissipation factor ($\Delta$ tan $\delta$) and molecular weight of a maximum frequency in molecular weight distribution (Mp) of PPS in PPS-ceramic composite material that was left under a humid condition of 85° C. and 85% RH for 1,000 hours.
Figure 8:
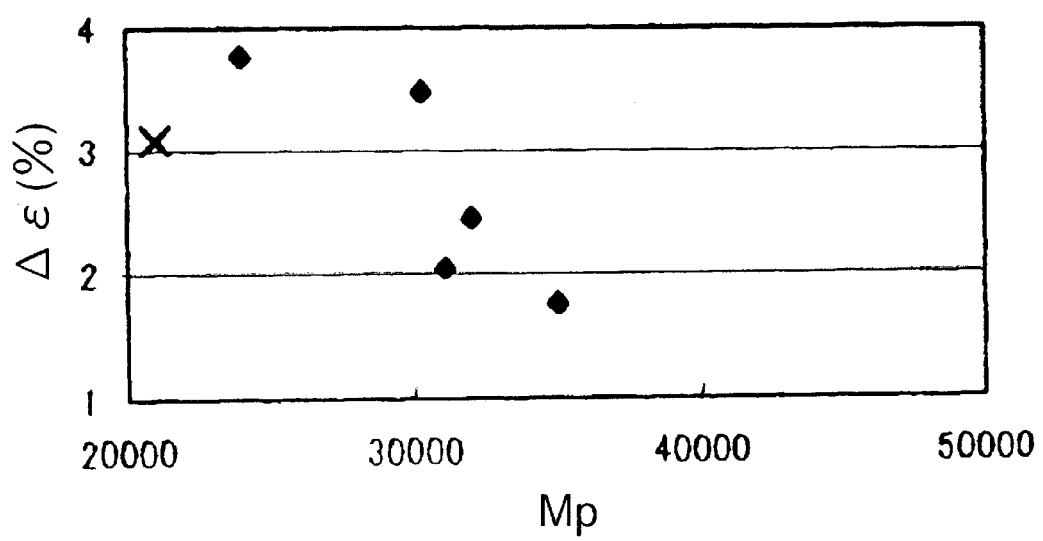
FIG. 8 is a graph showing the relationship between a change of dielectric constant ($\Delta\in$) and molecular weight of a maximum frequency in molecular weight distribution (Mp) of PPS in PPS-ceramic composite material that was left under a humid condition of 85° C. and 85% RH for 1,000 hours.

FIGS. 3, 4, 7, and 8 are graphs, in which Mw as abscissa in aforementioned FIGS. 1, 2, 5, and 6 is changed to Mp. As shown in FIGS. 4 and 8 of these, a change rate of $\in$ suddenly decreases around Mp=31,000. Mp of 31,000 to 36,000 is preferable and Mp of 31,000 to 33,000 is most preferable for PPS.

In a case of electric part materials, it is sometimes required that both $\in$ and tan δ are small in change. It was found that the change of both $\in$ and tan δ owing to moisture absorption could be controlled, with a use of not only Mw but also Mp as a standard in the selection of PPS to be used for the composite material. In other words, the composite material with a little characteristic change by moisture can be obtained by employing PPS that has Mw of 35,000 or more and Mp of 31,000 or more.

On the other hand, PPS with too large Mw or Mp may cause a decrease of fluidity, formability, and allowable addition quantity (in terms of parts by weight) of ceramic powder.

Any of crosslinking type, semi-linear type, or linear type can be used as PPS for use in the present invention.

The resin-ceramic composite material (composition) of the above PPS material base, has the following properties in addition to the said characteristics.

1̂ A resin-ceramic composite material with a superior temperature stability can be obtained by choosing a dielectric ceramic powder with a high temperature stability, because both changes of linear expansion coefficient and $\in$ are small in the range of a general operating temperature (−40 to 85° C.) for electric parts.

2̂ It is suitable for electric parts because of superior solder reflow heat resistance, as a result of high heat resistance.

3̂ It is easy to process and low in cost, because it can be subjected to injection molding and is good at flowability.

Kinds of dielectric ceramic powder mixed with such PPS are not particularly limited. Various kinds of ceramic powders like $TiO_2$ can be used. If PPS satisfies said constitutions, a composite material exhibits a common effect, in so far as the said point of a little characteristic change owing to humidity absorption is concerned.

(On the Composite Material Comprising Specific Dielectric Ceramic Powder and Specific PPS)

It is preferable to choose powder of dielectric ceramic of the present invention, which has a high $\in$, a low dielectric dissipation factor, and a little temperature dependency of $\in$, for obtaining a resin-ceramic composite material with further superior characteristics.

Dielectric ceramics of the present invention described in aforementioned items (1) to (5), particularly dielectric ceramics of $BaO$—$Nd_2O_3$—$TiO_2$—$Bi_2O_3$—Nb—Zn—Sr-rare earth element (except for Nd)-series, satisfy all the above conditions and they are most suitable ceramics.

As one of preferable embodiments of the present invention, a resin-ceramic composite material obtained by mixing a $BaO$—$Nd_2O_3$—$TiO_2$—$Bi_2O_3$—La—Ce—Pr—Nb—Zn—Sr-series dielectric ceramic powder and an organic polymer resin can be mentioned.

Furthermore, a composite material comprising a $BaO$—$Nd_2O_3$—$TiO_2$—$Bi_2O_3$—La—Ce—Pr—Nb—Zn—Sr-series dielectric ceramic powder and a PPS having Mw of 35,000 or more, and Mp of 31,000 or more, is extremely superior composite material as a dielectric material, because it exhibits a high $\in$, a small tan δ, and is small in change of characteristics owing to humidity fluctuation and temperature fluctuation ($\Delta\in$ and $\Delta$ tan δ). A small antenna and other electrical parts with a superior stability can be provided with employing the composite material.

(On a Third Component)

Various kinds of additives may be added as a third component to the resin-ceramic composite material of the present invention.

a. Coupling Agent

It is effective to employ coupling agents as such additives, for raising adhesion between the resin and the dielectric ceramic powder. Any type of coupling agent, such as silane-series or titanate-series can be used, but an attention should be paid to employ an agent whose influence on $\in$ and a value of a dielectric dissipation factor of the composite material (composition) is small.

b. Low Dielectric Inorganic Filler

In addition, a powder state or fiber state low dielectric constant inorganic filler may be added as a third component.

For example, an antenna gain of a microstrip antenna (MSA) tends to decrease, as a radiation conductor becomes small. Because of this, an antenna with a dielectric of a higher $\in$ than required gives a little gain though the size becomes small. Thus, it is necessary to set $\in$ relatively lower than usual, for an antenna, which is required to have a big gain prior to a small antenna-size. However, when the addition quantity of dielectric ceramic powder is simply reduced in order to set $\in$ low, a resin ratio in the composite material becomes large. Consequently, such a reduction may cause defects that a mold shrinkage coefficient at injection-molding becomes large, a coefficient of linear thermal expansion of the product becomes large, and the like. In this case, an addition of an inorganic filler with a low dielectric constant avoids an excessively high $\in$ of the composite material, and prevents a miniaturization of the radiation conductor, and thereby prevents a decrease of an antenna gain.

An inorganic filler with a dielectric dissipation factor not more than 0.001, $\in$ not more than 5, and a little temperature dependency of $\in$, is preferable for such an inorganic filler as the third component. For example, glass powder, glass fiber, feldspar, and clay are available. An effect of decreasing linear expansion coefficient of the composite material can be expected for glass powder and glass fiber.

Thus, an antenna design of such a size of a radiation conductor as to prevent a decrease of a gain, becomes easy, by adjusting $\in$, with an addition of a low dielectric constant inorganic filler to the aforementioned composite material.

C. Lubricity Auxiliary

In addition, a lubricity auxiliary may be added to the resin-ceramic composite material of the present invention. In the case of the composite material of the present invention, molding can be difficult because of a low flowability resulting from highly filled ceramic powders. In this case, the moldability can be improved with an addition of a lubricity auxiliary. For example, under a condition where a composite material without an addition of a lubricity auxiliary causes an unfilled part (short) in the cavity at an injection molding, a composite material added with a lubricity auxiliary may fill the cavity properly. As the lubricity auxiliary, carbon black, an organic acid-series wax, such as ethylene bis-stearic acid amide or oleic acid amide, a hardened castor oil, and the like can be mentioned. But attention must be sufficiently paid to an addition quantity so as not to deteriorate the electrical characteristics of the composite material.

(On the Electrical Parts)

In addition, various kinds of electrical parts such as a condenser, a filter, and a printed circuit board for a high frequency use are exemplified as an electrical part of the present invention. An electrical part of the present invention is characterized in using the resin-ceramic composite material of the present invention. The other configuration/structure and the like are not particularly different from those of a conventional one, and the same as those described in each JP-A-10-12479, JP-A-10-22167, JP-A-10-13104, JP-A-10-32405, JP-A-10-22701, and JP-A-10-22709.

Miniaturization of an electrical part is enabled by the composite material of the present invention. Stabilization of characteristics is also enabled.

(On the Antenna)

Figure 9:
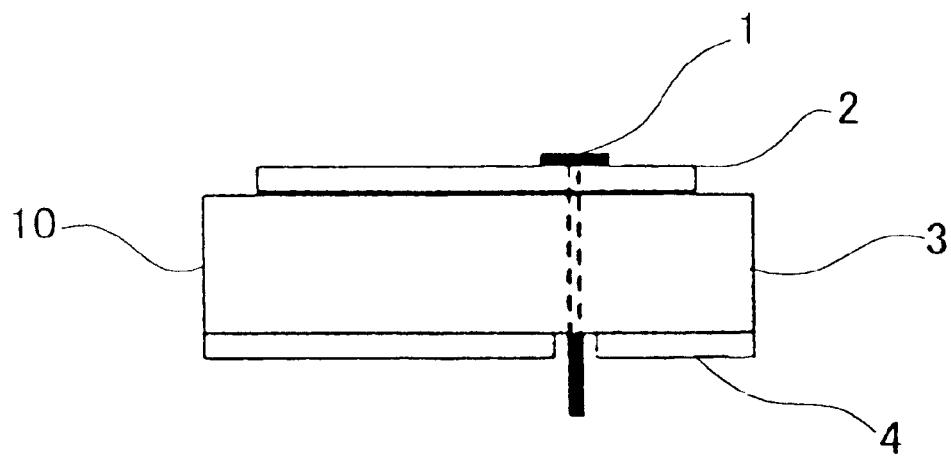
FIGS. 9(A) and 9(B) illustrate an embodiment of an antenna according to the present invention.
Figure 9:
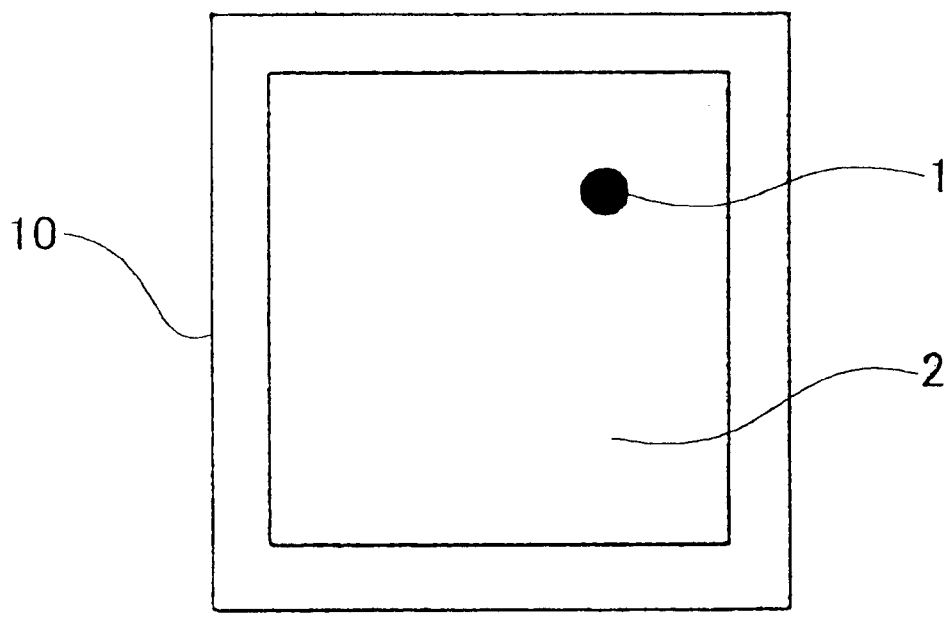

Various kinds of antennas, such as for GPS (global positioning system) and ETC (electronic toll collection), can be mentioned as antennas of the present invention. An example of an antenna for GPS is shown in FIGS. 9(A) and (B) as a preferable embodiment. FIG. 9(A) and FIG. 9(B) show a front view and a plane view of said antenna, respectively. In the figures, numbers 1, 2, 3, and 4 represents respectively; a feed pin, which penetrates the inside from the top to the bottom of the antenna 10; a radiation conductor of the GPS antenna (for example, electrolytic copper foil, copper sheet, and copper plating); a dielectric made of a resin-ceramic composite material; and a ground conductor of the GPS antenna provided on the bottom face of said dielectric.

Above FIG. 9(A) and (B) show a microstrip antenna (MSA), but the antenna of the present invention is not limited by the figures. For instance, an antenna in which a linear antenna such as, a monopole, a helical, or a meandrine shaped, which is adjacent with or wrapped by the composite material of the present invention can be preferable. Thus, the size can be reduced with using the composite material of the present invention as a dielectric of an antenna. Further, the characteristics also can be stabilized.

(On the Method for Manufacturing an Antenna or an Electrical Part)

A method for manufacturing an antenna or an electrical part by means of molding and plating the above-mentioned resin-ceramic composite material will be explained in the next.

At first improved points from a conventional plating method are described in the followings.

In the present invention, a PPS skin layer formed in a molding is removed as a pretreatment for plating. A special solvent need not be entirely used for the pretreatment (modification) in the plating process according to the present invention.

A mean particle diameter of 1 to 6 $\mu$m is preferable for dielectric ceramic powders. Too fine dielectric ceramic powders cause difficulty in handling at blending. On the other hand, too big particle diameter of powders decrease a quantity per unit area of boundary between ceramic powders and resin (where micro-crack occurs), and may cause too big pits that are formed after ceramic powders fell down. Thus, the resultant surface does not work as anchor, rather results in a state that so called wall of PPS is formed, and therefore plating becomes difficult, and low adhesion strength of the plated film occurs. Moreover, it may sometimes become an obstacle at an antenna molding and a micro-processing in a metal patterning.

As a pretreatment for plating, a skin layer of molded PPS can be removed with a physical etching treatment, such as a sand blasting, a wet blasting, polishing, and a plasma etching.

In addition, an antenna or a high frequency circuit substrate with a desired patterning shape can be directly obtained, when an undesired portion of PPS for plating is covered with a metal mask or a resist mask, thereafter a skin layer is removed with a sand blasting, a plasma etching, or the like, and then the resultant surface is plated. This is because only the portion being removed of the skin layer is plated selectively, while the portion covered with a mask is not plated because of the remained PPS skin layer at the surface.

According to the method of the present invention, it is considered that the micro cracks being formed on the boundary between fine ceramic powder and resin are used as anchors. Thus, satisfactory plating can be carried out, without dissolution of PPS or surface modification by a special solvent.

With this preparation method, plating can be carried out on a PPS-ceramic composite material without using a special solvent, which results in an easy manufacturing of electrical parts, such as an antenna and a printed circuit substrate for a high frequency use.

(The Best Mode for Carrying out the Invention)

The $xBaO—yNd_2O_3—zTiO_2—wBi_2O_3$ base dielectric ceramic comprising 3.2% of La, 1.2% of Ce, 0.3% of Pr, 0.1% of Nb, 0.1% of Zn, and 0.2% of Sr (a mean particle diameter of 3.2 µm) is used as a dielectric ceramic powder, wherein x=0.16, y=0.30, z=0.42, and w=0.12.

This and PPS (with a trade name of T-3AG (Mw=36,400 and Mp=32,000) made by TOHPREN Co., Ltd.) are mixed with 2 axis extruder to make an admixture pellet. A mixture ratio of PPS is set to be 52 volume % to the whole.

Carbon black (with a trade name of #7400, made by Tokai Carbon Inc.) is used as a lubricity auxiliary, and an agent with a trade name of KBM403 made by Shin-Etsu Chemical Co., Ltd. is used as a coupling agent. In addition, a glass filler (with a trade name of MCF-200C made by TATSUMORI Co., Ltd.) is blended as an inorganic filler of a low dielectric constant for the purpose of adjusting ∈ (tan δ=0.001, ∈=3.6, temperature dependency of ∈=70 ppm/° C.). The addition quantity is 1 wt % of a lubricity auxiliary (to PPS), 1 wt % of a coupling agent (to PPS), and 3 wt % of an inorganic filler of a low dielectric constant (to the said dielectric ceramic powder).

A molding is made from the admixture pellet with injection molding. PPS skin layers on each face are removed with blasting sand treatment to the top and bottom side of the molding. A copper film is formed respectively on the top and bottom sides of the molding with electroless copper plating and electrolytic copper plating. A GPS antenna of FIG. 9(A) and (B) can be produced with a wet etching of copper at unnecessary portions, after protecting the pattern part with a photosensitive resist.

The dielectric ceramics of the present invention has a low dielectric dissipation factor tan δ, a high dielectric constant ∈, and, besides, a little temperature change of dielectric constant ∈. And, the resin-ceramic composite material of the present invention, which employs the specific dielectric ceramic powder, has superior characteristics, such as a low dielectric dissipation factor, a high dielectric constant, and a little temperature change of dielectric constant.

The resin-ceramic composite material of the present invention, which comprises the specific dielectric ceramic powder and PPS, has a further improved temperature stability in addition to said characteristics.

The resin-ceramic composite material of the present invention, which comprises the specific dielectric ceramic powder and PPS with predetermined molecular weights (Mw and Mp), has a superior moisture stability in addition to said characteristics.

The resin-ceramic composite material of the present invention, which comprises an arbitrary dielectric ceramic and PPS with predetermined molecular weights (Mw and Mp), has a superior moisture stability.

The resin-ceramics composite material of the present invention described above, is preferably used for electrical parts, such as an antenna, a condenser, a filter, and a printed circuit substrate for a high frequency use, and can reduce the size and the production cost. In addition, the composite material allows inclusion of a low dielectric constant inorganic filler in the composite material as a third component, therefore it is possible to adjust ∈ of an antenna to a required gain when used as a dielectric of the antenna.

In addition, a manufacturing method of the present invention allows a PPS-ceramic composite material to be plated without using a special solvent, and allows electrical parts, such as an antenna, and a printed circuit substrate for a high frequency use, to be produced easily.

EXAMPLES

In the followings, the present invention is explained according to examples more in detail, but the present invention is not limited to those. Note that the sign of % concerning on a composition represents mass % (the composition as a whole makes up 100 mass %) so long as not particularly defined in the remainders.

Example A1

A powder of a $xBaO—yNd_2O_3—zTiO_2—wBi_2O_3$ base dielectric ceramic including La of 2.6%, Ce of 1.3%, Pr of 0.4%, Nb of 0.2%, Zn of 0.1%, and Sr of 0.2% was used as the ceramic powder (the mean particle diameter of 3 µm baking temperature of 1,170° C.). In the above, x=0.15, y=0.30, z=0.43, and w=0.12. One mass part of a silane coupling agent (a trade name of KBM403, made by Shin-Etsu Chemical Co., Ltd.) was dry blended to 400 mass parts of said powder. This mixture and PPS (∈=3.3, tan δ=0.003, (Mw=36,400, Mp=32,000, a trade name of T-3AG made by TOHPREN Co. Ltd.) as an organic polymer resin, were mixed with 2 axis extruder to obtain an admixture pellet. The mixture ratio of PPS was set to be 100 mass parts to 400 mass parts of the powder. A plate of 3 mm thick of PPS ceramic composite material was made from the admixture pellet with an injection molding.

An ∈, a dielectric dissipation factor, and a temperature dependency of ∈ were measured for this plate. Furthermore, an effective ∈ of the dielectric ceramic powder blended was calculated from the measured ∈, using the aforementioned formula (1). For reference, a sintered material was made, using the said dielectric ceramic powder, at 1,300° C., and its ∈ was measured. (Polyvinyl alcohol was used as a binder.)

Example A2

A powder of a $xBaO—yNd_2O_3—zTiO_2—wBi_2O_3$ base dielectric ceramic including La of 3.2%, Ce of 1.2%, Pr of 0.3%, Nb of 0.1%, Zn of 0.1%, and Sr of 0.2% was used as a ceramic powder (the mean particle diameter of 3 µm, baking temperature of 1,150° C.), wherein x=0.16, y=0.30, z=0.42, and w=0.12. At first, one mass part of a silane coupling agent (KBM403, made by Shin-Etsu Chemical Co., Ltd.) was blended in a dry process to 600 mass parts of said powder. On the other hand, 0.007 mass parts of octyl acid manganese, and 0.75 mass parts of nonylphenol were added to 100 mass parts of cyanate ester (a trade name of CY-40S, made by Asahi-Chiba Co., Ltd.), and then the ceramic powder was gradually added with stirring, to prepare a mixture. The mixing ratio of the cyanate resin was set to be 100 mass parts to 720 mass parts of the powder. This was pulverized, after the solvent was sufficiently volatilized at a room temperature, and the resulted powder was cast into a mold, and was molded by means of thermal pressing at 180° C. to prepare a 3 mm thick plate of a cyanate resin-ceramic composite material.

Same as the example A1, an ∈, a dielectric dissipation factor, and the temperature dependency of ∈ were measured, and the effective ∈ was calculated, with respect to the composite material. In addition, the sintered material was made by using the said dielectric ceramic powder at 1,300° C., and the ∈ was measured. (Polyvinyl alcohol was used as a binder.)

Example A3

The same ceramic powder as the example A1 was kneaded with polyethylene (a trade name of HI-ZEX 5000S, made by Mitsui Chemicals, Inc.) by means of a roll, and was formed with a thermal press to a 3 mm thick plate of a polyethylene-ceramic composite material. The mixing ratio of the polyethylene was set to be 100 mass parts to 300 mass parts of the ceramic powder.

Example A4

A plate of 3 mm thick of a PPS-ceramic composite material was prepared just in the same way as in the Example A1, except that a ceramic powder comprising calcium titanate of 79%, $Bi_2O_3$ of 17%, and $La_2O_3$ of 4% (a mean particle diameter of 4.3 μm) was used as the dielectric ceramic powder.

Example A5

A plate of 3 mm thick of a PPS-ceramic composite material was made just in the same way as in the Example A1, except that ceramic powder comprising xBaO—$yNd_2O_3$—$zTiO_2$—$wBi_2O_3$-based ceramic including Mn of 0.1% was used as the dielectric ceramic powder (a mean particle diameter of 110 μm).

In the above, x=0.16, y=0.30, z=0.42, and w=0.12.

Example A6

A plate of 3 mm thick of PPS-ceramic composite material was made just in the same way as in the Example A1; except that ceramic powder comprising barium titanate of 79%, calcium titanate of 6.5%, and $ZrO_2$ of 8.5% as main components, and including Ce of 5% and Sr of 1% to the main components, was used as the ceramic powder, and the mixing ratio of the PPS was set to be 100 mass parts to 260 mass parts of the ceramic powder.

Items such as ∈ were measured on each sample, in the same manner as in example A1.

The above-mentioned test results were shown in the following Table 1.

effective ∈ of 145, respectively, which value was remarkably higher than that of the composite materials of examples A4 and A5. This was utterly unexpected result because the ∈'s of the sintered materials made from the ceramic powders were as low as 105 and 103. Namely, generally a baked ceramic has high ∈, and an effective ∈ is deteriorated when the ceramic is pulverized (cf. examples A4 to A6). On the contrary, in the ceramics of examples A1 to A3, the effective ∈ of the powder was higher than the ∈ of the sintered material, respectively.

The ceramic powders used in the composite materials of examples A1 to A3 do not show any decrease of ∈ with powderization, and consequently it becomes unnecessary to make a particle diameter of a ceramic powder large, for the purpose of avoiding a decrease of an ∈, as in a conventional composite material. In other words, a satisfactory superior surface smoothness of a level that is required for use as a dielectric for a printed circuit board for a high frequency use, an antenna, and the like, can be achieved, even with a finely pulverized ceramic powder.

Example A7

A GPS antenna 10 shown in FIG. 9(A) and (B) was obtained with mixed pellet prepared in example A1, by an electrolytic copper foil inserted injection molding. The size was 28×28×4.2 mm for the antenna, and 21 mm square for the radiation conductor 2, and the ground electrode (ground patch) 4 on the back had the size identical to that of the antenna. The electrolytic copper foil of 35 μm thick was used for a radiation pattern or a ground patch of the GPS antenna. The characteristics of the GPS antenna provided from this experiment were 1.575 GHz for a reception frequency, and +2 dBi for a zenith direction antenna gain. It was confirmed that the GPS module set provided with LNA could catch a satellite at every temperature of −40° C. to 85° C.

Example B1

As dielectric ceramic powder, $TiO_2$ (a mean particle diameter of 4.4 μm) was used. One mass part of a silane base

TABLE 1

|  | Example A1 | Example A2 | Example A3 | Example A4 | Example A5 | Example A6 |
|---|---|---|---|---|---|---|
| Dielectric constant of composite material (at 1 GHz) | 20 | 31 | 9.5 | 17 | 11 | 16 |
| Dielectric dissipation factor of composite material (at 1 GHz) | 0.002 | 0.004 | 0.002 | 0.002 | 0.002 | 0.006 |
| Temperature dependency of dielectric constant (ppm/° C.) | −6 | −30 | Not measured | −127 | −2 | −373 |
| Effective dielectric constant of ceramic powder | 145 | 145 | 145 | 110 | 45 | 240 |
| Dielectric constant of ceramic sintered material (1 GHz) | 105 | 103 | 105 | 203 | 110 | 7190 |

From the results shown in Table 1, it is understood that the resin-ceramic composite material of examples A1 and A2 had such a little temperature dependency as a change of ∈ with temperature fluctuation was within ±30 ppm/° C., in spite of having a high ∈. The reason why ∈ of examples A1, A2, and A3 were so high is considered to be a result of the dielectric ceramic powders mixed to the resins had an coupling agent (a trade name of KBM403 made by Shin-Etsu Chemical Co., Ltd.) was blended to 400 mass parts of said powder in dry process. This mixture and PPS shown in Table 2 were mixed with a 2 axis extruder to obtain an admixture pellet. As to the mixing ratio, the volume mixture ratio of PPS was set to be 0.64 assuming the admixture as a whole to be 1. A plate of 2 mm thick of a PPS-ceramic mixture was made from this admixture pellet with an injection molding. The molded plate was left under a humid condition of 85° C. and 85% RH for 1,000 hours, then the changes of tan δ and ∈ (at 500 MHz) were measured. The changes of tan δ and ∈ were shown in Table 2, and they were plotted into graphs and they were shown in FIGS. 1 to 4.

TABLE 2

| Sort of PPS | Mp | Mw | Δtanδ (at 500 MHz) | Δ∈ (%) at 500 MHz |
|---|---|---|---|---|
| T-1 | 24000 | 27500 | 0.025 | 4.63 |
| T-2 | 30300 | 34700 | 0.024 | 4.50 |
| T-3 | 31100 | 38200 | 0.008 | 2.52 |
| T-3AG | 32000 | 36400 | 0.014 | 2.89 |
| LC5 | 35000 | 45000 | 0.004 | 1.92 |
| K-4 | 21000 | 344000 | 0.004 | 3.88 |

Example B2

Dielectric ceramic powder (a mean particle size of 3 μm) of $0.15BaO—0.30Nd_2O_3—0.43TiO_2—0.12Bi_2O_3$ base dielectric ceramic including La of 2.6%, Ce of 1.3%, Pr of 0.4%, Nb of 0.2%, Zn of 0.1%, and Sr of 0.2% was used as the dielectric ceramic powder.

At first, one mass part of a silane base coupling agent (a trade name of KBM403, made by Shin-Etsu Chemical Co., Ltd.) was blended to 400 mass parts of said powder in dry process. This and PPS shown in Table 3 were mixed with a 2 axis extruder to obtain admixture pellet. The volume mixing ratio of PPS to the admixture as a whole was set to be 0.64 to 1. A plate of 2 mm thick of a PPS-ceramic mixture was made from this admixture pellet with an injection molding. The molded plate was left under a humid condition of 85° C. and 85% RH for 1,000 hours, then the changes of tan δ and ∈ (at 500 MHz) were measured. The changes of tan δ and ∈ were shown in Table 3, and they were plotted into the graphs shown as FIGS. 5 to 8.

TABLE 3

| Sort of PPS | Mp | Mw | Δtanδ (at 500 MHz) | Δ∈ (%) at 500 MHz |
|---|---|---|---|---|
| T-1 | 24000 | 27500 | 0.004 | 3.78 |
| T-2 | 30300 | 34700 | 0.005 | 3.48 |
| T-3 | 31100 | 38200 | 0.002 | 2.05 |
| T-3AG | 32000 | 36400 | 0.003 | 2.45 |
| LC5 | 35000 | 45000 | 0.001 | 1.76 |
| K-4 | 21000 | 344000 | 0.002 | 3.09 |

From these results, followings are understood.

The change of tan δ owing to water absorption, namely Δ tan δ, is definitely improved with a turn at Mw=35,000 (FIGS. 1 and 5).

Therefore, Δ tan δ can be largely improved by using PPS with Mw of not less than 35,000.

However, a change of ∈ owing to water absorption is not improved even with large Mw, being different from the case of tan δ (FIGS. 2 and 6).

Contrary, when the abscissa was replaced to Mp, the change of ∈ by water absorption, namely Δ∈, decreases with increase of molecular weight (Mp), which means that humidity resistance increases with increase of molecular weight (Mp), and the effect is definitely improved with a turn at Mp=31,000 in particular (FIGS. 4 and 8).

On the other hand, a change of Δ tan ∈ by water absorption is not predictable from Mp (cf. FIGS. 3 and 7).

Example B3

A powder of a $xBaO—yNd_2O_3—zTiO_2—wBi_2O_3$ base dielectric ceramic including La of 3.2%, Ce of 1.2%, Pr of 0.3%, Nb of 0.1%, Zn of 0.1%, and Sr of 0.2%, was used as the dielectric ceramic powder (the mean particle diameter of 3.2 μm), wherein x=0.16, y=0.30, z=0.42, and w=0.12.

This powder and PPS (a trade name of T-3AG, made by TOHPREN Co., Ltd.) were mixed with 2 axis extruder to obtain an admixture pellet. A mixing ratio of PPS was set to be 53 volume % to the whole. A molding with the size of 28×28×4.2 mm was made from the admixture pellet with injection molding. PPS skin layers were removed by means of a sand blast treatment to the top and bottom sides of the molding, which treatment abraded about 3 μm of the surface on each face. A copper film of 35 μm thick was formed on each of the top and bottom faces of the molding with electroless copper plating and electrolytic copper plating. A GPS antenna shown in FIG. 9(A) and (B) was finished with a wet etching of copper at unnecessary parts, after protecting the pattern part with a photosensitive resist.

The characteristics of the GPS antenna were 1.575 GHZ for a reception frequency, and +2 dBi for a zenith direction antenna gain. It was confirmed that the GPS module set provided with LNA could catch a satellite at a temperature ranging −40° C. to 85° C.

In addition, the result of a peel strength test of the copper film on the surface of the GPS antenna was shown in Table 4.

Example B4

A GPS antenna was made from a dielectric ceramic powder, which had a mean particle diameter of 5.2 μm, and had the same composition as to example B3, in the same step as example B3.

The result of a peel strength test of the copper film on the surface of the GPS antenna was shown in table 4.

This peel test was carried out in conformance with the "tape test" in the peel test standard of JIS-H8504.

TABLE 4

| | Peel strength (N/cm) |
|---|---|
| Example B3 | 7.64 |
| Example B4 | 7.25 |

Example B5

A molding with the size of 28×28×4.2 mm was made with injection molding, in the same way as example B3. PPS skin layers at the parts without a resist mask thereon were removed, by means of blasting sand to the top and bottom face, after protecting the parts of the molding which would not be copper plated, with a photosensitive resist. Electroless and electrolytic copper plating were carried out after the resist mask was peeled. A GPS antenna of FIG. 9(A) and (B) could be produced directly, because the part without being blasted was not plated.

Industrial Applicability

Because the dielectric ceramic powder of the present invention and the resin-ceramic composite material of the present invention, which employ the powder of the dielectric ceramic, have superior characteristics, such as a low dielectric dissipation factor, a high dielectric constant, and a little temperature change of dielectric constant, they are preferable for electrical parts, such as an antenna, a condenser, a filter, and a printed circuit substrate for a high frequency use.

In addition, electrical parts, such as an antenna, of the present invention are suitably used to reduce the size and the production cost.

Further, a manufacturing method of the present invention allows a PPS-ceramic composite material to be plated without using a special solvent, and is suitable for a easier production method of electrical parts, such as an antenna and a printed circuit substrate for a high frequency use.

Having described our invention as related to the present embodiments, it is our intention that the invention not be limited by any of the details of the description, unless otherwise specified, but rather be construed broadly within its spirit and scope as set out in the accompanying claims.

What is claimed is:

1. A resin-ceramic composite material, comprising a mixture of a powder of a dielectric ceramic that includes BaO, $Nd_2O_3$, $TiO_2$, $Bi_2O_3$, Nb, Zn, and Sr as constituent elements, and an organic polymer resin, wherein the organic polymer resin is polyphenylene sulfide.

2. The resin-ceramic composite material according to claim 1, wherein the dielectric ceramic further includes rare earth elements (except Nd) as constituent elements.

3. A resin-ceramic composite material, comprising a mixture of a powder of a dielectric ceramic and an organic polymer resin, wherein the organic polymer resin is polyphenylene sulfide, and wherein the dielectric ceramic is one, in which, to a main composition expressed by $xBaO \cdot yNd_2O_3 \cdot zTiO_2 \cdot wBi_2O_3$, wherein $0.13 \leq x \leq 0.20$;
$0.28 \leq y \leq 0.35$;
$0.33 \leq z \leq 0.45$;
$0.09 \leq w \leq 0.15$; and
x+y+z+w=1, La, Ce, Pr, Nb, Zn, and Sr as constituent elements are included with amounts ranging 2 to 5 mass % for La, 1 to 2 mass % for Ce, and 0.03 to 1 mass % for each of Pr, Nb, Zn and Sr, and wherein all ceramics as a whole, including the above main composition, make up 100 mass %.

4. The resin-ceramic composite material according to claim 3, wherein a mass average molecular weight of the polyphenylene sulfide is 35,000 or more.

5. The resin-ceramic composite material according to claim 3, wherein a molecular weight at a maximum frequency in molecular weight distribution of the polyphenylene sulfide is 31,000 or more.

6. The resin-ceramic composite material according to claim 3, wherein a mean particle diameter of the ceramic powder used in the resin-ceramic composite material is 6 μm or less.

7. The resin-ceramic composite material according to claim 3, wherein an inorganic filler with a dielectric dissipation factor of not more than 0.001, a dielectric constant of not more than 6, and a temperature dependency of dielectric constant of not more than ±100 ppm/° C., is added as a third constituent.

8. The resin-ceramic composite material according to claim 3, wherein a lubricity auxiliary is added to the resin-ceramic composite material.

9. An electrical part, which is prepared using the resin-ceramic composite material of claim 3.

10. The electrical part according to claim 9, wherein a surface of the resin-ceramic composite material is plated.

11. An antenna, whose dielectric is formed with the resin-ceramic composite material of claim 3.

12. The antenna according to claim 11, wherein a surface of the resin-ceramic composite materiel is plated.

13. A resin-ceramic composite material, comprising a mixture of a dielectric ceramic powder, and polyphenylene sulfide with a weight average molecular weight of not less than 35,000 and a molecular weight at a maximum frequency in molecular weight distribution of not less than 31,000, wherein the dielectric ceramic is one, in which, to a main composition expressed by $xBaO \cdot yNd_2O_3 \cdot zTiO_2 \cdot wBi_2O_3$, wherein $0.13 \leq x \leq 0.20$;
$0.28 \leq y \leq 0.35$;
$0.33 \leq z \leq 0.45$;
$0.09 \leq w \leq 0.15$; and
x+y+z+w=1, La, Ce, Pr, Nb, Zn, and Sr as constituent elements are included with amounts ranging 2 to 5 mass % for La, 1 to 2 mass % for Ce, and 0.03 to 1 mass % for each of Pr, Nb, Zn and Sr, wherein all ceramics as a whole, including the above main composition, make up 100 mass %.

14. A method for producing an electrical part with a resin-ceramic composite material, comprising steps of:

molding the resin-ceramic composite material obtained by mixing a dielectric ceramic powder with a mean particle diameter of not more than 6 μm, and polyphenylene sulfide, by an injection-molding, wherein the dielectric ceramic powder is one, in which, to a main composition expressed by $xBaO \cdot yNd_2O_3 \cdot zTiO_2 \cdot wBi_2O_3$, wherein $0.13 \leq x \leq 0.20$;
$0.28 \leq y \leq 0.35$;
$0.33 \leq z \leq 0.45$;
$0.09 \leq w \leq 0.15$; and
x+y+z+w=1, La, Ce, Pr, Nb, Zn, and Sr as constituent elements are included with amounts ranging 2 to 5 mass % for La, 1 to 2 mass % for Ce, and 0.03 to 1 mass % for each of Pr, Nb, Zn and Sr, and wherein all ceramics as a whole, including the above main composition, make up 100 mass %;

removing a surface skin layer consisting of only polyphenylene sulfide that is formed on the surface of the molded article; and plating thereon.

15. A method for producing an antenna with a resin-ceramic composite material, comprising steps of:

molding the resin-ceramic composite material obtained by mixing a dielectric ceramic powder with a mean particle diameter of not more than 6 μm, and polyphenylene sulfide, by an injection-molding, wherein the dielectric ceramic powder is one, in which, to a main composition expressed by $xBaO \cdot yNd_2O_3 \cdot zTiO_2 \cdot wBi_2O_3$, wherein $0.13 \leq x \leq 0.20$;
$0.28 \leq y \leq 0.35$;
$0.33 \leq z \leq 0.45$;
$0.09 \leq w \leq 0.15$; and
x+y+z+w=1, La, Ce, Pr, Nb, Zn, and Sr as constituent elements are included with amounts ranging 2 to 5 mass % for La, 1 to 2 mass % for Ce, and 0.03 to 1 mass % for each of Pr, Nb, Zn and Sr, and wherein all ceramics as a whole, including the above main composition, make up 100 mass %;

removing a surface skin layer consisting of only polyphenylene sulfide that is formed on the surface of the molded article; and plating thereon.

16. A resin-ceramic composite material, comprising a mixture of dielectric ceramic powder and polyphenylene sulfide, wherein the dielectric ceramic includes BaO, $Nd_2O_3$, $TiO_2$, $Bi_2O_3$, Nb, Zn, and Sr as constituent elements, and wherein an inorganic filler with a dielectric dissipation factor of not more than 0.001, a relative dielectric constant of not more than 6, and a temperature dependency of dielectric constant of not more than ±100 ppm/° C., is added as a third constituent.

* * * * *